United States Patent Office 3,790,544
Patented Feb. 5, 1974

---

3,790,544
PROCESS FOR THE POLYMERIZATION OF CYCLOALKENES
Dieter Maertens, Günther Lehnert, and Gottfried Pampus, Leverkusen, Germany, assignors to Bayer Aktiengesellschaft, Leverkusen, Germany
No Drawing. Filed Feb. 9, 1972, Ser. No. 224,926
Claims priority, application Germany, Feb. 10, 1971,
P 21 06 301.4
Int. Cl. C08f 1/34
U.S. Cl. 260—93.1                                14 Claims

ABSTRACT OF THE DISCLOSURE

A process for the polymerization of unsaturated alicyclic compounds, characterized in that at least one cyclic olefine having 4, 5, 7 or more ring carbon atoms and at least one olefinic double bond in the ring is polymerized in the presence of a catalyst system consisting of (a) a salt of molybdenum or tungsten,
(b) an organometallic compound of aluminum and
(c) a Lewis acid or an adduct of a Lewis acid and a Lewis base as co-catalyst and the catalyst for this polymerization.

---

It is known to polymerize cycloalkanes in the presence of molybdenum compounds or tungsten compounds combined with organo compounds or hydride of metals of Groups IA to IIIA and alkyl hydrides of Group IVA of the Periodic System of Elements (Handbook of Chemistry and Physics, 47th edition, Chemical Rubber Co., Cleveland, Ohio, USA (1966)) to produce linear unsaturated transpolyalkenamers.

Furthermore, a process for the production of cis-polypentenamers has been described in Deutsche auslegeschrift No. 1,072,811 and No. 1,299,868. However, the process described there cannot be carried out on large scale because long induction periods and low stereospecificity can be avoided only if polymerization is carried out in the absence of solvents. The polymer yields are very low, i.e. below 20% both when using solvent-free polymerization or when using polymerization in solution, because cross-linking occurs at about 20% conversion. Moreover, in the solvent-free polymerization of Deutsche auslegeschrift No. 1,299,868, sterically uniform cis-polypentenamers are obtained only at a high cyclopentene:molybdenum ratio which aslo reduces polymer yields severely. Thus in this process variation in molecular weights, molecular weight distribution and elasticity of the polymers is obtained only at the expense of steric uniformity.

The formation of trans-polypentenamers on a catalyst mixture of a halide or oxyhalide or molybdenum or tungsten and an aluminum halide in the absence of aluminum alkyls has been described in Deutsche auslegeschrift No. 1,909,226. This process, however, requires very long induction periods. Moreover, no control can be exerted over the molecular weights and the extent of gel formation.

This invention relates to a process for the polymerization of unsaturated alicyclic compounds wherein at least one cyclic olefine having 4, 5, 7 or more ring carbon atoms and at least one olefinic double bond in the ring is polymerized in the presence of a catalyst of (a) a salt of molybdenum or tungsten,
(b) an organoaluminum compound and
(c) a Lewis acid or an adduct of a Lewis acid and Lewis base as co-catalyst, and to this catalyst.

Suitable monomers for the polymerization according to the invention are cyclic olefines having 4, 5, 7 or more (preferably up to 12) ring carbon atoms, e.g. cyclobutene, cyclopentene, cycloheptene, cyclooctene or norbornene. These olefines may be homopolymerized or they may be copolymerized with each other in any ratio as well as with preferably up to 50% by weight of other polymerizable unsaturated monomers, for example with aliphatic dienes having, e.g., 4 to 8 carbon atoms such as butadiene-(1,3), chloroprene, isoprene and pentadiene-(1,3), alicyclic diolefines or triolefines such as norbornadiene, cyclooctadiene or cyclododecatriene or aliphatic monoolefines such as butene-1.

Suitable molybdenum or tungsten salts for use in the process according to the invention are particularly the halides, oxyhalides or interhalides (halide meaning fluoride, chloride, bromide or iodide) for example $MoF_6$, $MoF_5Cl$, $MoCl_5$, $MoCl_4$, $MoCl_3$, $MoCl_2$, $MoBr_4$, $MoBr_3$, $MoBr_2$, $MoI_4$, $MoI_3$, $MoI_2$, $MoOF_4$, $MoO_2F_2$, $Mo_2O_3Cl_6$, $MoCl_4$, $MoOCl_3$, $MoO_2Cl_2$, $WF_6$, $WCl_6$, $WCl_5$, $WCl_4$, $WCl_2$, $WBr_6$, $WBr_5$, $WBr_4$, $WI_4$, $WI_2$, $WOF_4$, $WOCl_4$, $WO_2Cl_2$, $WOBr_4$, $WO_2Br_2$.

The organoaluminum compounds used for the preparation of the catalyst system according to the invention preferably have the general formula $AlX_nR_{3-n}$ in which R represents alkyl (preferably containing 1–20 carbon atoms), cycloalkyl (preferably containing 3–8 carbon atoms), aryl (preferably containing 6–20 carbon atoms) or alkyl aryl (alkyl $C_1$–$C_6$; aryl $C_6$–$C_{10}$) and X represents halogen (F, Cl, Br, I), hydrogen or alkoxy (preferably 1–10 carbon atoms), the radicals —$OCH_3$; —$OC_2H_5$; —$OC_4H_9$ and —$OC_5H_{11}$ being especially preferred, and $n=0$, 1 or 2.

Preferred organoaluminum compounds are $Al(C_2H_5)_3$, $Al(iC_4H_9)_2H$, $Al(iC_4H_9)_3$, $Al(C_2H_5)_2Cl$, $Al(C_2H_5)_2OC_4H_9$, $Al(C_3H_7)_2Br$, $Al(C_2H_5)_2F$, and $Al(C_2H_5)_2I$.

The Lewis acids or corresponding adducts used are compounds of elements of the Groups IIIA to VIA and IIB of the Periodic System of Elements (cf. Handbook of Chemistry and Physics, 47th edition (1966) page B–3) with the exclusion of compounds of the elements C, N and O.

The following are given as examples of elements from which the Lewis acids used as co-catalysts or adduct components may be derived: B Al, Ga, In, Tl, Si, Ge, Sn, Pb, P, As, Sb, Bi, Se, Te, Zn and Cd, their compounds with fluoride, chlorine, bromine or iodine being particularly suitable.

The following are examples of these: boron trihalides such as $BF_3$, $BCl_3$, $BBr_3$, $BI_2$; aluminum trihalides such as $AlCl_3$, $AlBr_3$, $AlJ_3$; silicon tetrahalides such as $SiCl_4$; tin tetrahalides such as $SnCl_4$, $SnBr_4$, $SnI_4$, phosphorus trihalides such as $PCl_3$, $PBr_3$; phosphorus pentahalides such as $PCl_5$; antimony pentahalides such as $SbCl_5$, $SbBr_5$; zinc dihalides such as $ZnCl_2$, $ZnBr_2$.

Boron trihalides, aluminum trihalides and tin tetrahalides are preferred.

Lewis bases (electron donors) are suitable for use as the second adduct component of the co-catalyst (c), especially compounds of N, P, O or S which have at least one free electron pair on these atoms, e.g. dialkyl ethers, alkyl aryl ethers, diaryl ethers, triethers, dialkyl thioethers, diaryl thioethers, alkyl aryl thioethers, alkyl esters of aliphatic glycols, dialkyl ketones, alkyl aryl ketones, diaryl ketones and esters (the above mentioned compounds may be halogenated); N-alkyl and N,N-dialkyl carboxylic acid amides, tert. alkylamines, tert. arylamines, tert. alkyl arylamines, alicyclic or aromatic compounds which contain N, O or S, trialkyl or aryl phosphines or "onium halides," e.g. sulphonium or oxonium halides.

The following are examples of such electron donor compounds: dimethyl ether, chloromethyl ether, bis-(2-chloroethyl)ether, methoxycyclohexane, methylphenyl ether, dibenzyl ether, ethylene glycol dimethyl ether, acetone, methyl-(1-chloroethyl) ketone, 3-methyl heptanone-(5), 1-phenyl propane-(1), diphenyl ketone, trimethoxy methane, butyl acetate, ethyl chloroacetate, dimethyl phosphite, triisopropyl phosphate, tris-(2-chloroethyl) phosphate, N,N-dimethyl formamide, N-methyl acetanilide, triethylamine, dimethyl aniline, ethyl diphenylamine, tetrahydrofuran, furan, 1,4-dioxane, piperidine, thiophene, triethyl phosphine, tricyclohexyl phosphine, triphenyl phosphine, dimethylsulphide, diphenyl sulphide and ethyl phenyl sulphide.

The following are examples of adducts of Lewis acids and Lewis basis: $BF_3.O(C_2H_5)_2$, $BCl_3.O(C_2H_5)_2$, $BF_3.C_5H_5N$, $BF_3.C_6H_5OH$, $AlCl_3.O(C_2H_5)$, $AlBr_3.(C_2H_5)_2$, $AlBr_2.C_5H_5N$. Of these $BF_3.O(C_2H_5)_2$ is preferred.

The process may be carried out with or without solvents.

Suitable solvents for the process according to the invention are aliphatic or alicyclic hydrocarbons containing 5–12 carbon atoms, e.g. pentane, heptane, cyclohexane or commercial gasoline fractions boiling at 60 to 200° C., aromatic hydrocarbons such as benzene and toluene and halogenated aliphatic or aromatic hydrocarbons such as chlorobenzene or mixtures of the above mentioned solvents.

The concentration of monomers, in the solution, is preferably 5 to 50% by weight, most preferably 15 to 30% by weight.

The catalyst amount is generally 0.01 to 10 mmol of the salt of Mo or W, preferably 0.2 to 1 mmol, per 100 g. of monomer.

The molar ratio of a:b is preferably from 1:0.1 to 1:5. The molar ration of a:c is generally from 1:0.1 to 1:20, preferably from 1:1 to 1:10.

The process according to the invention may be carried out by preparing a solution of the monomer or monomers and adding the catalyst components. If desired, however, the catalyst may be prepared in the absence of monomers. The process is preferably carried out under a protective gas atmosphere, for example of nitrogen or argon. The pressure employed is immaterial for the process of the invention and is governed by the technical requirements, however, the system should remain liquid. Polymerization generally proceeds at temperatures of from −100° C. to +50° C., and is preferably carried out at −60° C. to +30° C.

After polymerization, the catalyst is inactivated, e.g. by the addition of lower aliphatic alcohols such as methanol, ethanol or isopropanol or organic acids such as formic acid or stearic acid.

It is advisable to add chelate-forming substances such as ethanolamine, N-methyl ethanolamine, ethylene diamine, etc. in order to prevent significant quantities of the metals of the catalyst system from remaining in the polymer material. The polymers may be stabilized against the action of oxygen by the addition of known antioxidants such as 2,6-di-tert.-butyl-4-methyl-phenol, 2,2'-dihydroxy-3,3'-di-tert.-butyl-5,5'-dimethyl-diphenylmethane or phenyl-β-naphthylamine. The process may be carried out continuously or in batches.

The polymers may be precipitated from their solutions by the usual method of adding non-solvents such as lower alcohols, e.g. methanol or ethanol. In technical processes, it is preferred to isolate the polymer by introducing the inactivated and stabilized polymer solution into hot water, the mixture of solvent and water then distilling off as an azeotropic mixture. The polymer is obtained in the form of lumps. The lumps of rubber still moist with water may be dried in a drying cupboard, on a band drier or in a drying screw.

The polymers obtained have a high cis double-bond content or trans double-bond content, depending on the reaction conditions employed. It can be determined by the IR spectrum. They may be cross-linked with known curing agents and are suitable to produce any article of manufacture namely made of rubber.

The catalyst of the invention is advantageously used for polymerizing in inert solvents by a reaction involving ring opening. Unsaturated high molecular weight polyalkenamers are then obtained in very high yields and without gel formation. These polyalkenamers have a cis double-bond content of over 80% (of the total double bonds) when polymerization temperature of between −90 and −20° C. have been employed.

Completely dry apparatus and reagents are used in the following examples and the experiments are carried out under a protective atmosphere of pure nitrogen.

EXAMPLE 1

920 g. of toluene and 200 g. of cyclopentene are introduced into a stirrer vessel with exclusion of oxygen and water. 1 mmol of tungsten hexachloride ($WCl_6$) and 10 mmol of boron trifluoride diethyl ether ($BF_3$ etherate) which have previously been preformed in a solution in toluene for 2 hours are added to the mixture under pure nitrogen and the mixture is then cooled to −30° C. 2 mmol of aluminum triethyl ($Al(C_2H_5)_3$) dissolved in toluene are then added. Polymerization sets in at once and is carried out for 4 hours. It is then stopped by the addition of a mixture of 1 g. of 2,2'-dihydroxy-3,3'-di-tert.-butyl-5,5'-dimethyl-diphenyl methane, 1 g. of ethylene diamine, 5 g. of ethanol and 50 g. of toluene. The polymer is precipitated by introducing the polymer solution into 3 litres of ethanol and it is then dried under vacuum at 50° C. The yield in 63% of the theory, the cis double-bond content 84.4% and the gel content 0%.

EXAMPLE 2

1 mmol of $WCl_6$ and 10 mmol of $BF_3$ etherate are added to a mixture of 530 g. of toluene and 200 g. of cyclopentene which is then cooled to −30° C. in the same way as described in Example 1. 2 mmol of $Al(C_2H_5)_3$ dissolved in toluene are then added. The reaction mixture is polymerized for 4 hours. The yield is 59% of the theory, the cis double-bond content 94.3% and the gel content 0%.

EXAMPLE 3

1 mmol of $WCl_6$ and 5 mmol of $AlBr_3$ etherate are added to a mixture of 920 g. of toluene and 200 g. of cyclopentene which is then cooled to −30° C. in the same way as described in Example 1. 0.2 mmol of $Al(C_2H_5)_3$ in solution in toluene are then added. The reaction mixture is polymerized for 3 hours. The yield is 14.7% of the theory, the cis double-bond content 94% and the gel content 0%.

EXAMPLE 4

1 mmol of $WCl_6$ and 10 mmol of $BF_3$ etherate are added to a mixture of 920 g. of toluene and 200 g. of cyclopentene which is then cooled to −30° C. in the same way as described in Example 1. A solution of 1.5 mmol of $Al(C_2H_5)_3$ in toluene is then added. The reaction mixture is polymerized for 3 hours. The yield is 46.7% of the theory, the cis double-bond content 80.7% and the gel content 0%.

EXAMPLE 5

1 mmol of $WCl_6$ and 10 mmol of $BF_3$ etherate are added to a mixture of 920 g. of toluene and 200 g. of cyclopentene which is then cooled to −30° C. in the same way as described in Example 1. 2.5 mmol of $Al(C_2H_5)_3$ dissolved in toluene are then added. The reaction mixture is polymerized for 3 hours. The yield is 42% of the theory, the cis double-bond content 83.1% and the gel content 0%.

EXAMPLE 6

1 mmol of $WCl_6$ and 7 mmol of $BF_3$ etherate are added to a mixture of 920 g. of toluene and 200 g. of cyclopentene which is then cooled to $-10°$ C. in the same way as described in Example 1. 2 mmol of $Al(C_2H_5)_3$ dissolved in toluene are then added. The reaction mixture is polymerized for 4 hours. The yield is 31% of the theory, the cis double-bond content 47.7% and the gel content 0%.

EXAMPLE 7

1 mmol of $WCl_6$ and 10 mmol of $BF_3$ etherate are added to a mixture of 530 g. of toluene and 200 g. of cyclopentene which is then cooled to 10° C. in the same way as described in Example 1. 2 mmol of $Al(C_2H_5)_3$ dissolved in toluene are then added. The reaction mixture is polymerized for 4 hours. The yield is 54.5% of the theory, the cis double-bond content 22.7% and the gel content 0%.

EXAMPLE 8

1 mmol of $WCl_6$ and 10 mmol of $BF_3$ etherate are added to a mixture of 920 g. of toluene and 200 g. of cyclopentene and 2 mmol of $Al(C_2H_5)_3$ are thereafter added at room temperature as described in Example 1. The reaction mixture is polymerized for 4 hours. The yield is 51% of the theory, the cis double-bond content 11.2% and the gel content 0%.

EXAMPLE 9

0.25 mmol of $MoCl_5$ and 1.75 mmol of $BF_3$ etherate are added to a mixture of 115 g. of toluene and 25 g. of cyclopentene as described in Example 1 and 0.63 mmol of $Al(C_2H_5)_3$ are then added at room temperature. The reaction mixture is polymerized for 3 hours. The yield is 57% of the theory, the cis double-bond content 11% and the gel content 0%.

EXAMPLE 10

0.25 mmol of $MoCl_5$ and 2.5 mmol of $BF_3$ etherate are added to a mixture of 115 g. of toluene and 25 g. of cyclopentene as described in Example 1 and 0.5 mmol of $Al(C_2H_5)_3$ are added at room temperature. The reaction mixture is polymerized for 3 hours. The yield is 68% of the theory, the cis double-bond content 10.9% and the gel content 0%.

EXAMPLE 11

Comparison example

To demonstrate the activity of the adduct added to the catalyst system, 1 mmol of $WCl_6$ is added to a mixture of 920 g. of toluene and 200 g. of cyclopentene and thereafter 2 mmol of $Al(C_2H_5)_3$ are added at $-30°$ C. as described in Example 1. The reaction mixture is polymerized for 3 hours. The yield is 2% of the theory, the cis double-bond content 60.6% and the gel content 0%.

EXAMPLE 12

2 mmol of $WCl_6$ and 20 mmol of $BF_3$ etherate are added to a mixture of 1 litre of chlorobenzene and 300 ml. of cyclopentene which is then cooled to $-50°$ C. as described in Example 1. A solution of 4 mmol of $Al(C_2H_5)_3$ in toluene is then added. The reaction mixture is polymerized for 6 hours. The yield is 76.5% of the theory, the cis double-bond content 83.6% and the gel content 0%.

EXAMPLE 13

200 g. of cyclopentene are added to a mixture of 435 g. of toluene and 0.5 mmol of $WCl_6$ as described in Example 1 and thereafter 0.2 mmol of $Al(C_2H_5)_2Cl$ are added at room temperature followed by 1.05 mmol of $AlBr_3$. Polymerization sets in at once. The reaction temperature is kept between 25° C. and 28° C. by cooling. Polymerization is continued for 4 hours. The yield is 69% of the theory, the cis bond content 9%, $(\eta)=2.27$; gel content 0%.

EXAMPLE 14

200 g. of cyclopentene are added to a mixture of 435 g. of toluene and 0.5 mmol of $WCl_6$ as described in Example 1 and 0.2 mmol of $Al(C_2H_5)_2$ are then added at room temperature, followed by 1.05 mmol of $AlBr_3$. The reaction mixture is polymerized for 4 hours. The yield is 69% of the theory, the cis bond content 9%; $(\eta)=2.4$, gel content 0%.

EXAMPLE 15

200 g. of cyclopentene are added to a mixture of 435 g. of toluene and 0.5 mmol of $WCl_6$ and thereafter 0.2 mmol of $Al(C_2H_5)_3$ followed by 1.05 mmol of $AlBr_3$ are added at room temperature as described in Example 1. The reaction mixture is polymerized for 4 hours. The yield is 65% of the theory, the cis bond content 9%; $(\eta)=3.1$, gel content 0%.

EXAMPLE 16

Comparison example 1.05 mmol of $AlBr_3$ are added at room temperature to a mixture of 435 g. of toluene and 0.5 mmol of $WCl_6$ after the addition of 200 g. of cyclopentene as described in Example 1. The solution is stirred for 4 hours at 28° C. No polymerization occurred.

EXAMPLE 17

0.1 mmol of $Al(C_2H_5)_2Br$ followed by 1.1 mmol of $AlBr_3$ are added at room temperature to a mixture of 435 g. of benzene and 0.5 mmol of $WCl_6$ after the addition of 200 g. of cyclopentene as described in Example 1. The solution is then heated to 45° C. and polymerized for 4 hours. The yield is 51.5% of the theory, the cis bond content 8.6%; $(\eta)=2.2$; gel content=0%.

EXAMPLE 18

Example for comparison with 17

1.1 mmol of $AlBr_3$ are added at room temperature to a mixture of 435 g. of benzene and 0.5 mmol of $WCl_6$ after the addition of 200 g. of cyclopentene as described in Example 1. The solution is then heated to 45° C. and polymerized for 4 hours. The yield is 5% of the theory, the cis bond content 8.6%.

What is claimed is:
1. A process for polymerizing at least one cyclic olefin having 4, 5 or 7 to 12 ring carbon atoms which comprises polymerizing said olefin at a temperature of $-100$ to 50° C. in the presence of a catalytic amount of a catalyst composition comprising
   (a) a compound selected from the group consisting of $MoF_6$, $MoF_5Cl$, $MoCl_5$, $MoCl_4$, $MoCl_3$, $MoCl_2$, $MoBr_4$, $MoBr_3$, $MoBr_2$, $MoI_4$, $MoI_3$, $MoI_2$, $MoOF_4$, $MoO_2F_2$, $Mo_2O_3Cl_6$, $MoOCl_4$, $MoOCl_3$, $MoO_2Cl$, $WF_6$, $WCl_6$, $WCl_5$, $WCl_4$, $WBr_6$, $WBr_5$, $WBr_4$, $WI_4$, $WI_2$, $WOF_4$, $WOCl_4$, $WO_2Cl_2$, $WOBr_4$ and $WO_2Br_2$,
   (b) a compound of the formula $AlX_nR_{3-n}$ wherein R is alkyl having 1 to 20 carbon atoms, cycloalkyl having 3 to 8 carbon atoms, aryl having 6 to 20 carbon atoms or alkaryl having 1 to 6 carbon atoms in the alkyl moiety and 6 to 10 carbon atoms in the aryl moiety, X is hydrogen, halogen or alkoxy having 1 to 10 carbon atoms and $n$ is zero, 1 or 2 and
   (c) a co-catalyst which is a Lewis acid selected from the group consisting of fluorides, chlorides, bromides or iodides of B, Al, Ga, In, Tl, Si, Ge, Sn, Pb, P, As, Sb, Bi, Se, Te, Zn and Cd or an adduct of said Lewis acid with a Lewis base which is a dialkyl ether, an alkyl aryl ether, a diaryl ether, trimethoxy methane, a dialkyl thioether, a diaryl thioether, an alkyl aryl thioether, an alkyl ether of an aliphatic glycol, a dialkyl ketone, an alkyl aryl ketone, a diaryl ketone, an alkyl acetate, a halide of one of the afore- said compounds, an N-alkyl carboxylic acid amide, an N,N-dialkyl carboxylic acid amide, a tertiary alkylamine, a tertiary arylamine, a tertiary alkyl arylamine, an alicyclic or aromatic compound containing N, O or S, a trialkyl phosphine, a triaryl phosphine, a sulphonium halide or an oxonium halide, the molar ratio of (a):(b) being 1:0.1 to 1:5, the molar ratio of (a):(c) being 1:0.1 to 1:20 and there being 0.01 to 10 mmol of (a) per 100 g. of cyclic olefin.

2. The process of claim 1 wherein said polymerization is caried out in an inert solvent.

3. The process of claim 2 wherein the monomer concentration in the solvent is 5 to 50% by weight.

4. The process of claim 2 wherein the monomer concentration in the solvent is 15 to 30% by weight.

5. The process of claim 1 wherein 0.2 to 1 mmol of (a) is present per 100 g. of cyclic olefin 6. The process of claim 1 wherein said temperature is from −60 to 30° C.

7. The process of claim 1 wherein said cyclic olefin is cyclopentene, cycloheptene or cyclooctene.

8. The process of claim 1 in which said cyclic olefin is cylopentene.

9. The proess of claim 1 wherein (a) is $MoF_6$, $MoF_5Cl$, $MoCl_5$, $MoBr_4$, $WF_6$, $WCl_6$, $WCl_5$, $WCl_4$, $WBr_6$ or $WBr_5$.

10. The process of claim 1 wherein (b) is $Al(C_2H_5)_3$, $Al(iso\ C_4H_9)_3$, $Al(C_2H_5)_2Cl$ or $Al(C_2H_5)OC_4H_9$.

11. The process of claim 1 wherein said Lewis acid is a halide of one of said specified elements.

12. The process of claim 1 wherein said Lewis acid is boron trihalide, aluminum trihalide or tin tetrahalide.

13. The process of claim 1 wherein (c) is $$BF_3.O(C_2H_5)_2$$

14. The process of claim 1 wherein the molar ratio of (a):(c) is 1:1 to 1:10.

References Cited
UNITED STATES PATENTS

| | | | |
|---|---|---|---|
| 3,459,725 | 3/1969 | Natta et al. | 260—93.1 |
| 3,476,728 | 11/1969 | Natta et al. | 260—93.1 |

STANFORD M. LEVIN, Primary Examiner

U.S. Cl. X.R.

260—88.2 B, F; 252—429 C